United States Patent [19]

Geller et al.

[11] 4,179,194
[45] Dec. 18, 1979

[54] ELECTRICALLY CONTROLLABLE WIDE ANGLE OF VIEW OPTICAL NOTCH FILTER

[75] Inventors: Myer Geller; Daniel E. Altman; Glidden J. Barstow, all of San Diego, Calif.

[73] Assignee: The United States of America as represented by the Secretary of the Navy, Washington, D.C.

[21] Appl. No.: 654,124

[22] Filed: Feb. 2, 1976

[51] Int. Cl.² .............................................. G02F 1/17
[52] U.S. Cl. ................................. 350/356; 331/94.5 M
[58] Field of Search ........... 331/94.5, 94.5 M, 94.5 C; 350/160 R, 312, 353, 355, 356

[56] References Cited

U.S. PATENT DOCUMENTS

| | | | |
|---|---|---|---|
| 3,098,112 | 7/1963 | Horton | 331/94.5 |
| 3,458,249 | 7/1969 | George | 350/312 X |
| 3,522,553 | 8/1970 | Fox | 331/94.5 C |
| 3,581,228 | 5/1971 | Smith | 331/94.5 C |
| 3,621,460 | 11/1971 | Willett | 331/94.5 |
| 3,657,554 | 4/1972 | Lumpkin et al. | 331/94.5 Q |
| 3,760,295 | 9/1973 | Lankard et al. | 331/94.5 Q |

OTHER PUBLICATIONS

Hanes et al., *Metrologia*, vol. 5, No. 1, 1969, pp. 32, 33.

*Primary Examiner*—William L. Sikes
*Attorney, Agent, or Firm*—R. S. Sciascia; G. J. Rubens

[57] ABSTRACT

An electronically controllable, wide angle of view, notch filter operates to attenuate predeterminable narrow bandwidth wavelengths of light energy. An enclosure contains a selected material characterized by exhibiting strong quantum mechanical coupling between two determinable energy states of different levels above its ground energy state and also producing radiated emission within the desired narrow bandwidth wavelengths when externally excited to populate the upper of the two determinable energy states. Transparent windows at opposite ends complete the enclosure which is maintained at a desired temperature to vaporize the selected material. Two electrodes, oppositely positioned within the enclosure contiguous to its optical path, are connectable to a source of pulsed electrical energy to generate an electric discharge across the electrodes of sufficient strength to raise the vaporized selected material from its ground energy state to the lower of the two determinable higher energy states, causing selective absorption of predetermined narrow bandwidth wavelengths of light energy under the timed control of electrical actuation.

10 Claims, 6 Drawing Figures

ELECTRICALLY CONTROLLABLE WIDE ANGLE OF VIEW OPTICAL NOTCH FILTER

BACKGROUND OF THE INVENTION

Optical filters of the interference type are well known and have been widely used in the optical and related arts. Effective as such interference optical filters may be in some instances, they nonetheless suffer from several fundamental inherent disadvantages. One such disadvantage is that interference type of optical filters inherently produce a range of attenuating effects which cannot be confined to extremely narrow bandwidths such as may be desirable in certain optical systems. That is to say that, the narrowest bandwidth of attenuation achievable by the best designed and fabricated interference optical filters may be of the order of 2 Å to 5 Å in width. Thus, where an optical system requires substantial attenuation of a significantly smaller bandwidth of optical energy, the interference type of optical filter is not entirely satisfactory to accomplish the desired results.

Another detracting limitation of the interference type optical filter is that it will only perform efficiently to accomplish its design objectives when it is employed in a manner to accept incident light energy within a relatively small angle of view which may be of the order of 1° to 5° for example. Incident light energy received by an interference type optical notch filter which is outside its narrow and limited field of view will undergo different attenuation than light energy incident within the designed field of view; moreover, the bandwidth of significantly attenuated optical energy may also be significantly and undesirably broadened for light energy incident outside the restricted relatively narrow field of view.

Additionally, the interference type optical notch filter is, by its inherent nature, a passive device. That is to say that, it cannot be turned "off" and "on" but must always operate to attenuate certain wavelengths of optical energy since it has no "on" and "off" states and operates only in a single passive mode.

More recently, advanced investigation and development work has been accomplished in the field of narrow band optical filters as may be exemplified by the work of Benjamin Senitzky disclosed in an article titled "Narrow Band Ultraviolet Vapor Filter", published January 1975, in Volume 14, No. 1 of *Applied Optics* beginning at page 238. The Senitzky type of filter employs a mercury vapor cell which selectively attenuates the 2537 Å line over a bandwidth varying from 0.1 Å to 1.0 Å as a function of the internal vapor pressure of the mercury contained within the unit.

Senitzky attributes the attenuation and notch filter effects of his device to a form of selective specular reflection and suggests that the phenomena may be due to a type of re-radiation process taking place when a photon is absorbed by a ground state atom which makes a transition to an upper energy state. At a later time the atom then spontaneously emits a photon at or near the resonant wavelength and returns to its ground energy state. Thus, according to Senitzky's theorizing the operative effect of his filter is caused by a form of re-radiation taking place between the ground energy state and an upper or higher energy state of the vaporized material.

It is important to note, however, that the Senitzky device employs no electric field and is entirely a passive device which is not controllable in an "on"-"off" sense.

It is highly desirable therefore that the phenomena of extremely narrow bandwidth attenuation of certain vaporized materials be rendered available in an optical notch filter which is controllable in an on-off sense as may be required in certain optical systems. A Lidar system, for example, which is essentially an "optical radar", uses an optically responsive detector aimed at a target. The light sensitive detector must be protected from the backscatter of atmospheric light energy particularly during the period of time when a light energy pulse is initially transmitted toward a target.

Accordingly, there is a need for a conveniently controllable on-off type of optical notch filter capable of significantly attenuating extremely narrow bandwidths of light energy.

SUMMARY OF THE INVENTION

The present invention contemplates a wide angle notch filter for attenuating extremely narrow bandwidth wavelengths of light energy in an on-off sense through the control of an applied electric field.

An appropriate enclosure which may be comprised of suitable materials such as quartz, for example, contains a selected material.

In accordance with the teaching of the present invention, the material contained within the enclosure is selected for its characteristics of (1) exhibiting strong quantum mechanical coupling between two determinable energy states of different levels above its ground energy state and also for (2) producing radiated emission within the narrow bandwidth wavelength which it is desired to attenuate when the selected material is externally excited to populate the upper of the two determinable energy states of different levels above its ground energy state.

The enclosure assembly includes two windows which are substantially transparent to light energy propagated in a defined optical path and are supported at opposite ends of the enclosure. A suitable means, such as a thermostatically controllable oven, is employed for maintaining the enclosure assembly at a temperature to vaporize the selected material.

First and second electrodes are oppositely positioned within the enclosure contiguous to the optical path and have external terminals for connection to a source of electrical energy. The electrodes may be of a flat plate type positioned so as not to intercept the optical path, or, alternatively, they may be of a ring-type proximate to each of the oppositely disposed windows so as not to interfere with the defined optical path through the windows and the enclosure.

A source of pulsed electrical energy is arranged to be controllably connectable to the electrodes for generating an electric field thereacross within the enclosure. Convenient control of the electric field thus created within the enclosure may therefore be suitably given effect by an appropriate switch means. The electric field which is thus controllably initiated within the enclosure containing the vaporized selected material is characterized as being of sufficient strength to raise the vaporized selected material from its ground energy state to the lower of the two determinable higher energy state whereby selective absorption of the narrow bandwidth wavelengths of light energy propagated in the optical path is caused to occur precisely when desired. In the absence of the electric field, the notch filter of the present invention is substantially transparent and will permit the transmission of all wavelengths of light energy dependent only upon the transmittance characteristics of the previously described windows.

Thus, the present invention provides an extremely narrow band optical notch filter which is operatively controllable in the time domain as desired.

Accordingly, it is a primary object of the present invention to provide a wide angle field of view, optical notch filter for attenuating extremely narrow bandwidth wavelengths of light energy.

An equally important object of the present invention is to provide such an optical notch filter which is operably controllable in the time domain.

Another most important object of the present invention is to provide such a filter which may be implemented by the use of a broad variety of selectable materials to provide extremely narrow band filtering at different wavelengths as desired.

Another important object of the present invention is to provide an optical notch filter which is capable of providing substantial attenuation over an extremely sharp optical notch having a spectral width of as little as a portion of one Angstrom unit.

Another object of the present invention is to provide such an optical notch filter which funtions substantially independently of the angle of incidence of the light energy which it is desired to filter.

A further object of the present invention is to provide such an optical notch filter which, in contrast to the very high attenuation within an extremely narrow spectral bandwidth, which it is designed to filter, will nonetheless permit high transmission of light energy in substantially all other parts of the light spectrum.

Yet a further object of the present invention is to provide an optical notch filter which can be employed to interchangeably contain different selected materials in accordance with the particular spectral lines it is desired to filter.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
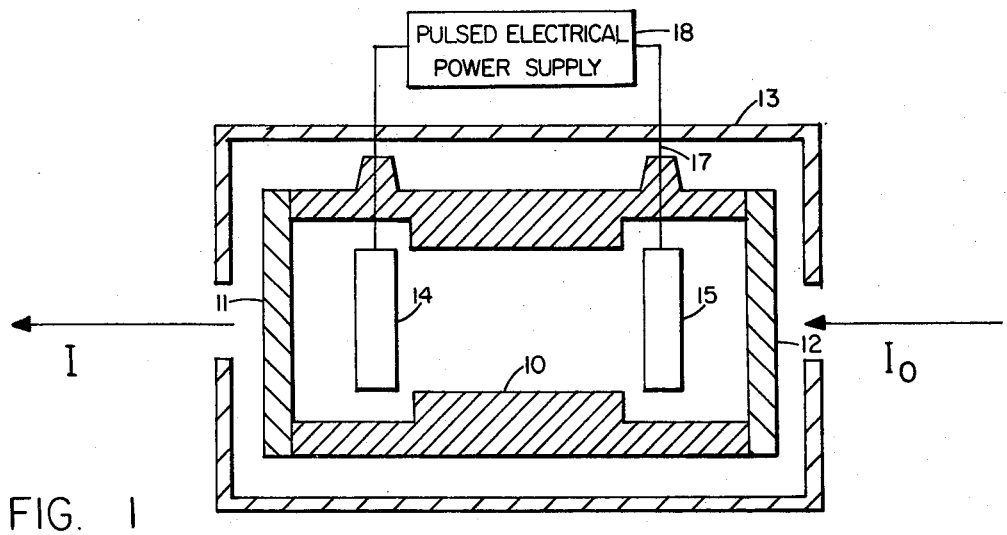
FIG. 1 is a partially cross-sectional illustration of an embodiment of the present invention.

FIG. 1 illustrates a typical embodiment of the present invention. An enclosure 10 is designed and adapted to contain a selected material. The selected material is particularly chosen for its characteristics of (1) exhibiting strong quantum mechanical coupling between two determinable energy states of different levels above its ground energy state, and (2) producing radiated emission within narrow bandwidth wavelengths when externally excited to populate the upper of the two energy states.

The assembly of the enclosure 10 also includes two windows 11 and 12 supported at opposite ends of the enclosure 10 in alignment with an optical path indicated generally by the arrows in the drawing. The windows 11 and 12 are chosen to be of a material which is substantially transparent to the light energy propagated in the optical path defined generally by the arrows in FIG. 1.

A means for maintaining the enclosure at a temperature to vaporize the selected material within the enclosure 10 may comprise a suitable oven 13 which is thermostatically controllable to maintain a substantially constant temperature within the enclosure 10. First and second electrodes 14 and 15, respectively, are oppositely positioned within the enclosure 10 contiguous to the optical path and in the embodiment illustrated by FIG. 1 may appropriately take the form of ring electrodes so as not to intercept or interfere with the optical path generally indicated by the arrows. The first and second electrodes 14 and 15 have external terminals 16 and 17 which are connected to a source of pulsed electrical energy 18 which may also include an appropriate switch means for controllably connecting the pulsed electrical energy source in circuit with the electrodes 14 and 15.

Figure 2:
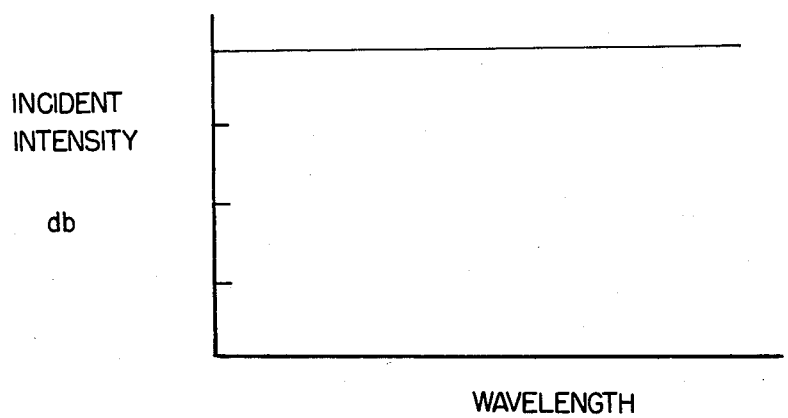
FIG. 2 is a graphical representation of the intensity of light energy versus wavelength spectrum of light energy incident upon a notch filter of the present invention.

The optical notch filter of the present invention as illustrated in FIG. 1, for example, is an active device in the sense that it may be controllably activated to perform its filter function by the connection of electrical energy through a suitable switch means included in the pulsed electrical energy source 18. In the absence of such activation, light energy propagated along the optical path indicated by the arrows will pass through the filter substantially unattenuated except for whatever minute amount of attenuation may be due to the transmittance characteristics of the windows 11 and 12. Thus, the intensity of incident light energy relative to wavelength as illustrated in FIG. 2 will emerge from the filter substantially unattenuated, which is typical of the operation of the optical notch filter of the present invention in its non-energized, unactivated state.

Figure 3:
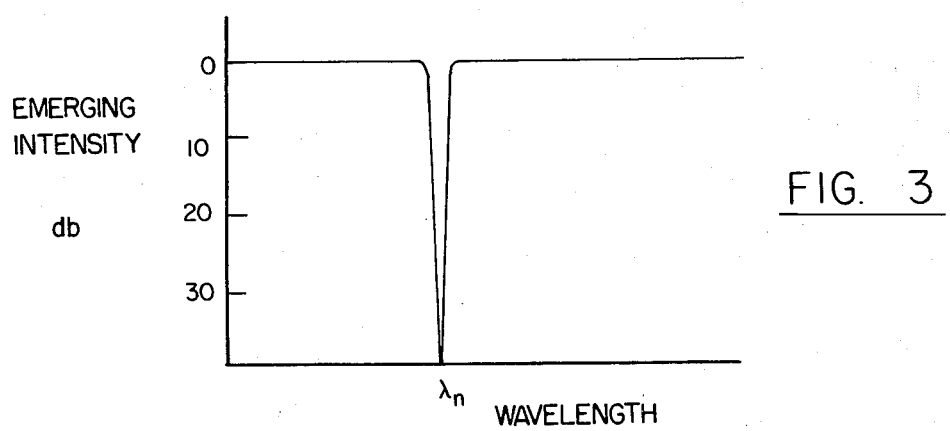
FIG. 3 is a graphical illustration of the intensity of light energy versus the wavelength of light energy emerging from a notch filter of the present invention.

However, when the pulsed electrical energy source 18 is connected to the electrodes 14 and 15 an electric field is generated within the enclosure 10 in accordance with the concept and teaching of the present invention. The electric field thus generated within the enclosure 10 is of sufficient strength to raise the vaporized selected material from its ground energy state to the lower of two determinable energy states and thereby causes selective absorption of the narrow bandwidth of wavelengths of light energy which it is desired to filter out of light propagated in the optical path. The intensity of the emergent light energy when the optical notch filter of the present invention is in its energized, activated state is illustrated in FIG. 3 showing a substantial attenuation in excess of 30 db relative to an extremely narrow band of wavelength. Thus, the present invention is an active filter which is controllable in an on-off sense to attenuate extremely narrow bandwidth wavelengths of light energy in an optical path when and as desired.

Figure 4:
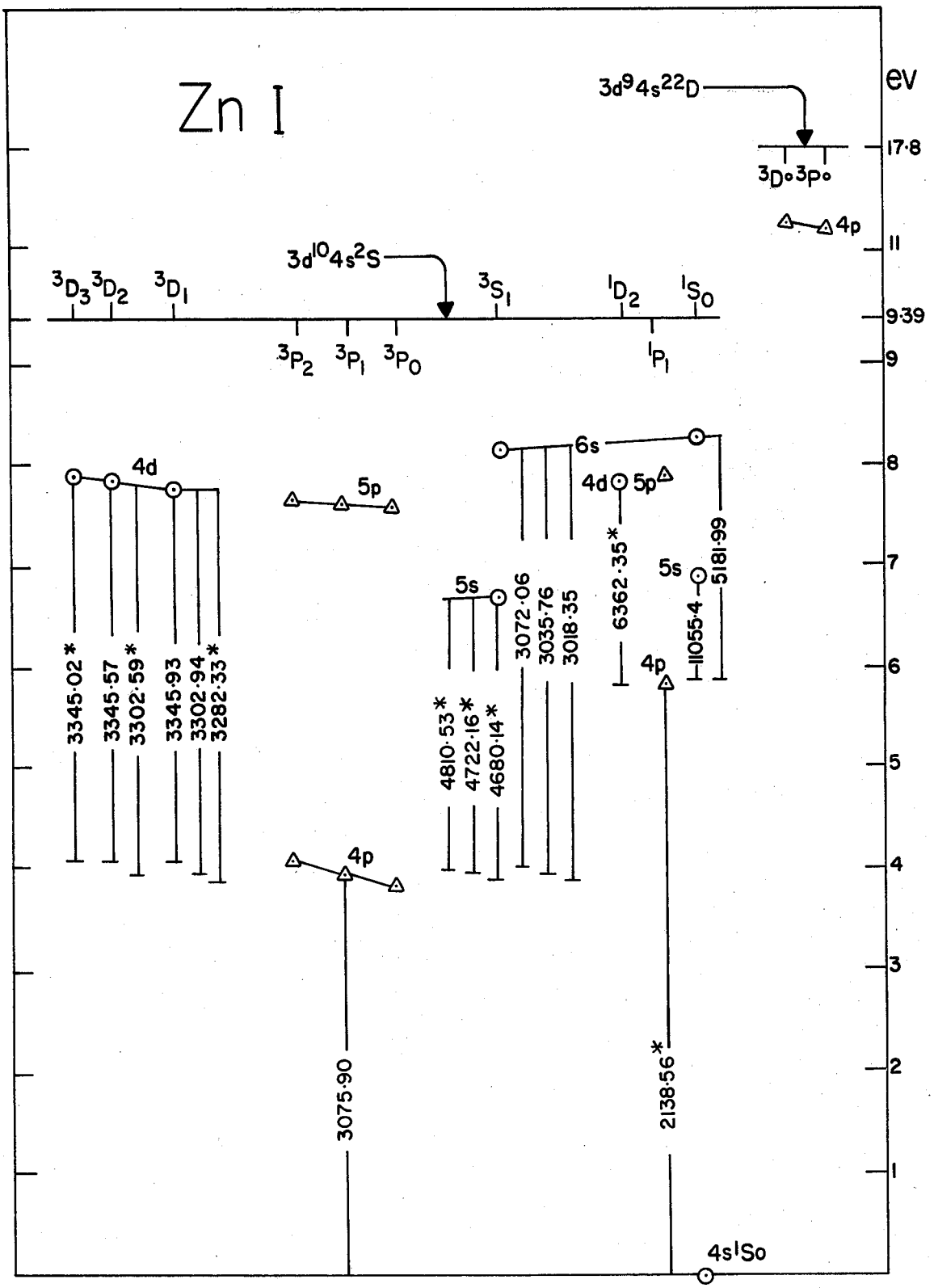
FIG. 4 is an illustration of energy levels for neutral zinc, ZnI.
Figure 5:
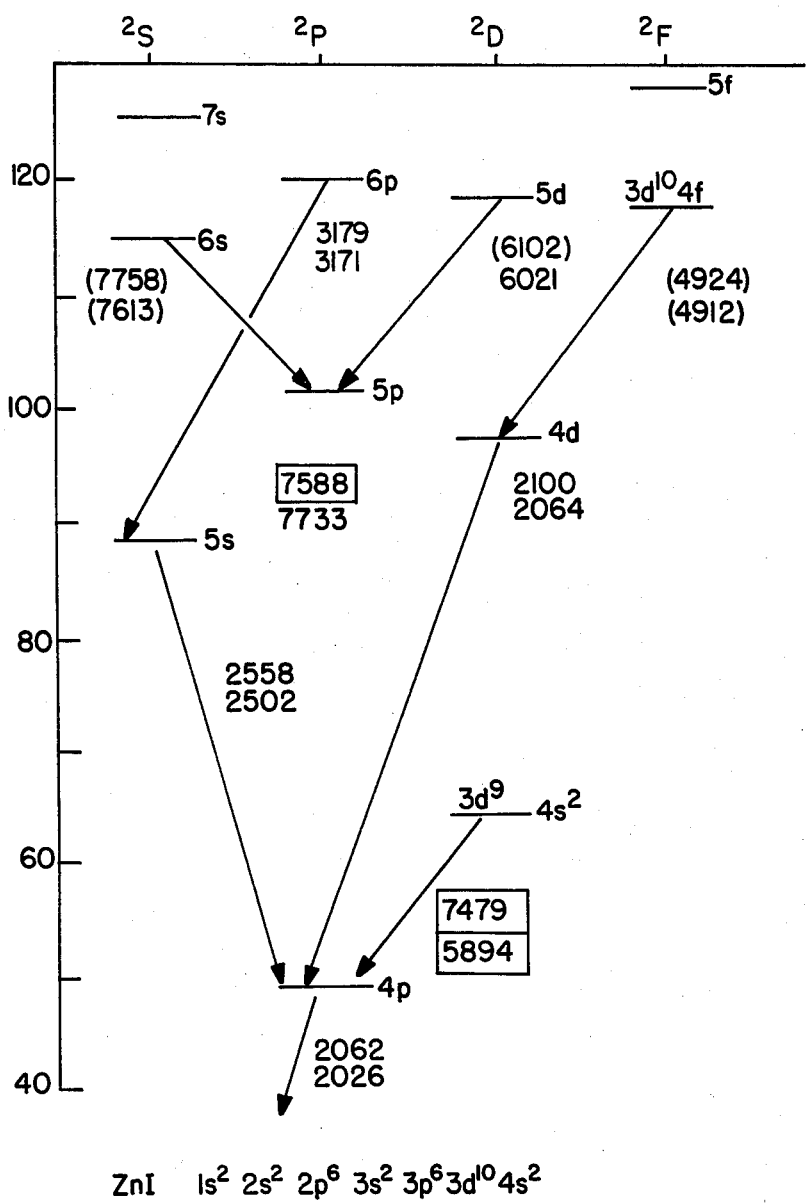
FIG. 5 is an illustration of the energy levels for singly ionized zinc, ZnII.

The concept of the present invention, as well as its appropriate use and operation, is based upon determinable characteristics of a large number of elements and compounds. It is well known that the vapor phase of an element or compound has many discrete sharply defined electronic levels or energy levels. One material which is suitable for use in the practice of the present invention is zinc in its neutral form, ZnI, and also its single ionized form, ZnII. FIGS. 4 and 5 show most of the energy levels for neutral zinc and singly ionized zinc, respectively. The lines drawn between these different levels indicate some, but not all, of the many possible electronic transitions between the levels.

Normally when zinc vapor is in thermal equilibrium i.e., no current flow, all the zinc atoms have their electrons in the lowest possible energy states. The outermost electron in this configuration is shown in FIG. 4 as the $4s^1S_o$ level. When the gaseous vapor of zinc is excited, as for instance, by the flow of electric current or coupled optical excitation, this electron will make transitions to other energy levels such as, for instance, the $4p$ level; then it will be carried down again to the ground energy state. The zinc atom can lose its outer electron discharge to become singly ionized zinc, ZnII, the energy levels for which are shown in FIG. 5.

All vapor gases at ordinary temperatures have their atoms in the ground energy state; i.e., they are not coupled to any excitation source. The resonant radiation which may be defined as the radiation of that wavelength which couples a ground energy state to some higher level excited energy state is heavily absorbed. As shown in FIG. 4, resonant radiation occurs at the wavelengths 3075 and 2138.6 Å. When zinc vapor is contained in a suitable enclosure positioned in an optical path, without activation by any external source of excitation, the wavelengths 3075 and 2138.6 Å of light energy propagating the optical path will be absorbed.

Vapors of all gases have distinctive resonant wavelengths such as those described which exhibit strong absorption characteristics. This is so because when the atom is in the ground energy state, each atom can be capable of absorbing some characteristic resonant wavelengths dependent on the material involved and generally the absorption constants are high for resonant transitions of the type described.

Another example of the resonant notch filter phenomenon is clearly apparent with regard to the relative electronic energy levels of sodium. When a suitable enclosure containing sodium vapor is interposed in an optical path, the wavelengths 5895 and 5889 Å are strongly absorbed, exhibiting the resonant phenomenon. As contrasted to the older interference type filter, the resonant optical notch filter of the type described above (and also disclosed by Senitzky) has the advantage of providing a relatively wide angle of view. That is to say that, the acceptance angle of the resonant type of optical notch filter is quite broad and, moreover, its operative characteristics are not significantly dependent upon the incident angle of the light energy which it receives.

The foregoing related background, which is believed useful in explaining the concept and operation of the present invention, has been known for some time. One of the main disadvantages of the resonant type of optical notch filter is that it is a passive device; that is to say, that it is not controllable in an on-off sense. Additionally, the number of narrow band spectral wavelengths which may be absorbed out of an optical path is limited to a fixed number of resonant transition phenomena which may be exhibited by vapors from elements or compounds. When the resonant type of optical notch filter is extended to include solids there is a similar limitation to the number of resonant transition phenomena exhibited by impurities in solids.

The present invention conceives and teaches a greatly expanded number of extremely narrow band wavelengths that can be effectively absorbed in an optical path and yet retain the advantage of having extremely wide field of view. Perhaps more importantly, however, the concept of the present invention contemplates an optical notch filter which is active, rather than passive, as is the case with the resonant optical notch filter described hereinbefore.

In accordance with the concept of the present invention, an optical notch filter is provided which is normally in the unactivated state, but which may be activated by being coupled to an external source of energy, such as an electrical impulse or a pulse of light energy, to perform its filter function for a determinable, well-defined period of time and then returned to its unactivated state. Therefore, the optical notch filter of the present invention is operative in the time domain and provides greatly extended operative advantages over the known prior art.

The active optical notch filter of the present invention accordingly provides control of the filter action by external means such as the coupling of electrical or optical energy to the selected material in a gaseous state. The ability to control the filter action in this manner is most important for many optical systems, such as for instance, optical radar.

Typically, optical radar may propagate a short nanosecond pulse of light in the direction of the target to be detected. In a ranging mode of operation, such optical radar determines the distance to the target by measuring the time it takes for the pulse of light to reach the target and then be returned to the point of transmission origin. Customarily, a light responsive detector with a filter for passing the frequency "f" of the pulse of light energy employed is aimed at the target. By monitoring the photo current output of the detector, such as with a cathode ray oscilloscope, the return of the reflected beam may be observed as a visual spike on the face of the cathode ray tube display.

A most troublesome problem that arises is that backscatter from the atmosphere, from the time $t_o$ at which the pulse of light energy is transmitted from its origin, may be, and generally is, orders of magnitude larger than the intensity of the reflected light pulse return from the target. This backscatter from the atmosphere accordingly can saturate the detector and thus the detector may not recover by the time when the reflected light pulse signal arrives at the detector. However, employing an optical notch filter of the present invention which operates to substantially attenuate at the frequency "f", the large amount of light energy from backscattering may be controllably absorbed during a period of time when the pulse of light energy is traveling to the target and then turned off to permit the reflected light energy signal to enter the detector for the desired detection and time measurement.

One of the most advantageous features of the concept of the present invention is that it affords great expansion of the potential number of wavelengths which can be absorbed by its use of the phenomena exhibited in the excited states of numerous materials. One illustration is that of zinc vapor. FIG. 5, for instance, shows the energy levels for single ionized zinc, ZnII. In FIG. 5, it may be seen that when the zinc vapor is not energized, none of the various energy levels are populated, no radiation is emitted, and therefore there is no absorption corresponding to any of the wavelengths. For example, the 4912, 4924 Å doublet is completely unattenuated in passage through the zinc vapor because the 4d level is empty normally. However, it has been found that upon external excitation of the zinc vapor, the 4d level may become heavily populated; in that condition the zinc plasma exhibits strong attenuation of an optical notched filter type within very narrow band wavelengths 4912 and 4924 Å.

Figure 6:
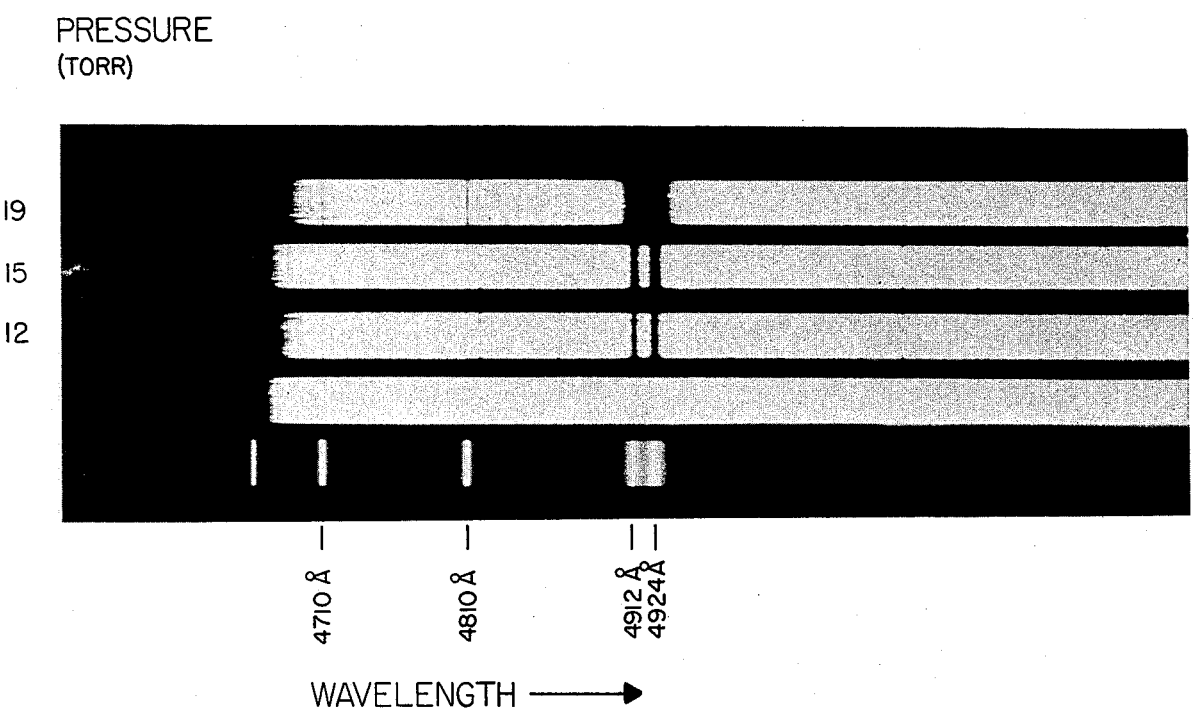
FIG. 6 are photographically recorded spectral characteristics contrasting the emission characteristics of zinc to its absorption characteristics and are availed of in accordance with the teaching of the present invention.

FIG. 6 illustrates photographically the relationship between the absorption of a particular material, in this case vaporized zinc, and its radiated emission lines when externally excited to populate the upper of two determinable energy states. The source of optical energy employed covers a wavelength range of approximately 4700 Å to slightly over 5200 Å. In the photograph of FIG. 6, the bottom spectrum is the emission spectrum from a pure vaporized zinc discharge. Strong emission lines are shown at 4710, 4810 Å from the ZnI spectrum and at the 4912 Å and 4924 Å doublet from the ZnII spectrum. This pulse discharge was photographically recorded at 12 torr of zinc vapor pressure.

The second from the bottom photographic representation is the broadband continuous spectrum realized from the pulsed source as transmitted through the enclosure of the present invention, but with no pulsed current through the zinc vapor. The third spectrum from the bottom of FIG. 6 shows the effect on the output by pulsing the zinc vapor so as to cause current flow therethrough. It should be noted that in the third spectrum from the bottom there are two dark areas in the output of the filter, evidencing strong absorption at the wavelengths 4912 and 4924 Å. Increasing the vapor pressure of the zinc to 15 torr increases the depth and width of the 4912, 4924 Å doublet as is shown in the fourth spectrum from the bottom.

At higher pressure still of 19 torr there was evidence of absorption also at 4710 and 4810 Å as well as a broadening of the absorption in the 4912, 4924 Å spectral range.

The results which are photographically illustrated in FIG. 6 were achieved by pulsing zinc vapor with an electric discharge having a current of several hundred amperes at a pulsed duration of approximately one microsecond. This controlled activation of the zinc plasma caused it to perform in a manner of a very strong notch filter at definite determinable wavelengths which are related to the transitions of determinable excited energy states. For example, strong absorption at 4912, 4924 Å demonstrates that the 4d level as shown in FIG. 5 becomes heavily populated by the action of the electric discharge.

Measurements have shown that this absorptive state has a short lifetime of about two microseconds, i.e., the 4d level remains populated only for this extremely short time after the current has ceased to flow. Therefore, the present invention may be controllably activated to perform its filtering function by controlling the magnitude of the current flowing from a pulsed energy source. Other wavelengths exhibited substantially the same effect, such as 4710 and 4810 Å previously mentioned as being associated with spectral phenomena of ZnI.

All the wavelengths which may be notch filtered in accordance with the concept and teaching of the present invention correspond to transitions of the atom. For example, the absorption at 4810 Å corresponds to the excess population of a $4p^3P_2$ state of the neutral zinc as shown in FIG. 4. Thus, the controllable externally activated optical notch filter of the present invention can be made to perform at many different wavelengths by exciting the atom or molecule of selected materials to some determinable excited state above its ground energy level state. If the efficiency of excitation to the excited state above the ground energy state is large, then the material will exhibit this form of selective absorption by excitation from the first excited energy state above ground energy state to a still higher energy state.

The materials which are adapted to use in the present invention may be atomic or molecular in form or impurity doped solids. The external excitation employed to raise the selected material to a desired higher energy state may be electrical or optical in nature, such as is effectuated by an electric field between electrodes energized by a pulsed electrical energy source or by a proximate pulsed light source. In either case, the selective material in its unenergized condition is completely passive so that the filtering action is externally controlled by electrical or optical means.

Elaboration regarding the relationship of ground state and two higher level energy states follows. The selected material is normally in the ground state $E_g$ and thus with no excitation to higher energy level it exhibits no absorptive characteristics with the exception of the resonant transition at wavelength $hc/E_1-E_g$. ($h=6.6\times10^{-27}$ erg. sec, Plancks constant; $c=3\times10^{10}$ cm/sec., speed of light). This phenomena is independent of excitation and is constant with time. That is to say that, it is not controllable in the time domain. If, however, by electrical discharge or optical coupling of light radiation of wavelength $hc/E_1-E_g$, the $E_1$ energy level state can be significantly populated, a selected material will perform in the manner of a notch filter to the wavelength $hc/E_1-E_2$, by exciting the electron from state $E_1$ to state $E_2$. This excited state filtering phenomena is externally controllable in the time domain by either electrical or optical means.

Accordingly, it may be readily appreciated by those skilled and knowledgeable in the pertinent arts that the concept and teaching of the present invention provides an optical notch filter having significant and highly desirable advantages as contrasted to the operative limitations of both interference filters and resonant optical notch filters which are known in the prior art. One of the most important of the new features afforded by the present invention is that it is externally controllable in the time domain and therefore may be turned on and off as desired to perform its attenuation and filtering functions. In its unactivated or off state the optical notch filter fabricated and operable in accordance with the teaching of the present invention is substantially transparent to optical energy transmitted therethrough. This degree of transmittance is impossible with the interference type of filters, for example.

Moreover, the extremely narrow bandwidth of wavelengths which can be significantly attenuated and absorbed under external control in accordance with the concept and teaching of the present invention, may be as narrow a notch as a small fraction of 1 A in width. This type of operation is most difficult if not virtually impossible employing an interference filter.

Furthermore, the optical notch filter of the present invention has a comparatively extremely wide angle of view in that its operative characteristics are not severely limited by the angle of incidence of light which it accepts for filtering. Advantageously, the operative filtering function is not altered in degree or in wavelength by differences in the incident angle of light received by filter.

The determination and selection of suitable materials for use in the practice of the present invention can be made through the use of suitable data which is readily available such as the circular of the National Bureau of Standards 467, issued Aug. 15, 1952, which provides atomic energy levels for a broad variety of materials, particularly metals, as derived from the analyses of optical spectra and also from the tables of spectral lines by A. N. Zaidel', V. K. Prokof'ev, S. N. Raiskii, V. A. Slavnyi, and E. Ya. Schreider as translated from the Russian and published by IFI/Plenum, New York, London, 1970.

Obviously many modifications and variations of the present invention are possible in the light of the above teachings. It is therefore to be understood that within the scope of the appended claims the invention may be practiced otherwise than as specifically described.

What is claimed is:

1. An electrically controllable, wide angle field of view, notch filter for attenuating narrow bandwidth wavelengths of light energy in an optical path comprising:

an enclosure containing a selected material, said material being characterized by exhibiting strong quantum mechanical coupling between two determinable energy states of different levels above its ground energy state, and producing radiated emission within said narrow bandwidth wavelengths when externally excited to populate the upper of said two determinable energy states;

means for maintaining said enclosure at a temperature to vaporize the selected material;

windows supported at opposite ends of said enclosure in alignment with said optical path, said windows being substantially transparent to the light energy propagated in said optical path;

first and second electrodes oppositely positioned within said enclosure contiguous to said optical path and having external terminals for connection to a source of electrical energy;

a source of pulsed electrical energy controllably connectable to said electrodes for generating an electric current discharge thereacross within said enclosure, said electric current discharge being of sufficient strength to raise the vaporized selected material from its ground energy state to the lower of said two determinable energy states, causing selective absorption of said narrow bandwidth wavelengths of light energy propagated in said optical path.

2. An electrically controllable wide angle notch filter as claimed in claim 1 wherein the amount of said selected material contained within said enclosure is chosen to produce a vapor pressure optimizing the selective absorption of said narrow bandwidth wavelengths of light energy.

3. An electrically controllable wide angle notch filter as claimed in claim 1 wherein said selected material comprises a metal in atomic form.

4. An electrically controllable wide angle notch filter as claimed in claim 1 wherein said selected material comprises zinc in atomic form.

5. An electrically controllable wide angle notch filter as claimed in claim 1 wherein said selected material comprises zinc in ionized form.

6. An electrically controllable wide angle notch filter as claimed in claim 1 wherein said selected material comprises mercury in atomic form.

7. An electrically controllable wide angle notch filter as claimed in claim 1 wherein said selected material comprises mercury in ionized form.

8. An electrically controllable wide angle notch filter as claimed in claim 1 wherein said selected material comprises cadmium in atomic form.

9. An electrically controllable wide angle notch filter as claimed in claim 1 wherein said selected material comprises cadmium in ionized form.

10. An electrically controllable wide angle notch filter as claimed in claim 1 wherein said selected material is in ionized form.

* * * * *